United States Patent Office 3,342,541
Patented Sept. 19, 1967

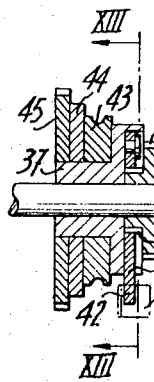
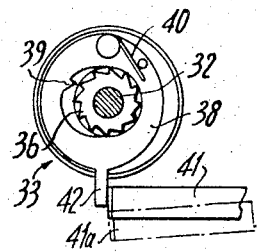
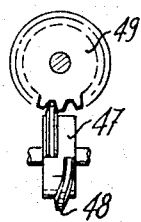
FIG. 12   FIG. 13   FIG. 14
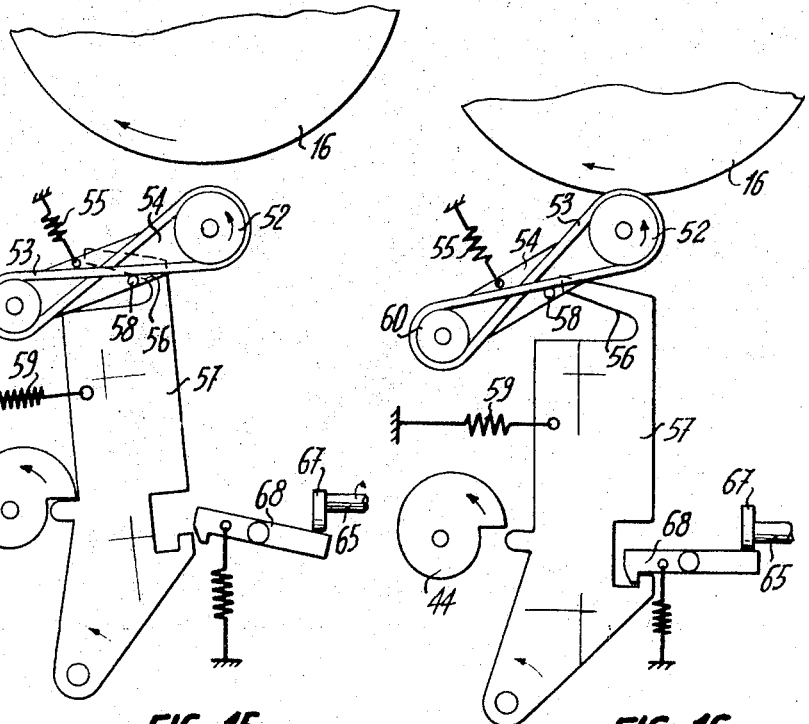
FIG. 15   FIG. 16

3,342,541
CINEMATOGRAPHIC PROJECTOR WITH INDEXING LOADER
Bob Mouissie and Claude Devenoges, Yverdon, Vaud, Switzerland, assignors to Paillard S.A., Sainte-Croix, Vaud, Switzerland, a company of Switzerland
Filed July 8, 1966, Ser. No. 565,349
6 Claims. (Cl. 352—123)

ABSTRACT OF THE DISCLOSURE

A cinematographic projector which includes a loader containing a plurality of reels of film and provides means for shifting the loader laterally to place a selected reel in position to be projected. Additional means correlated with the shifting means, is provided for receiving the film being projected and, after its projection is completed, simultaneously rewinding the projected film on its original reel while the next adjacent reel is moved into projecting position.

This application is a continuation-in-part of application Ser. No. 371,894, filed June 2, 1964, now abandoned.

The present invention relates to a cinematographic projector comprising a light source, a lens, a film driving mechanism, means for feeding the film to be projected and receiving means to receive the projected film.

Cinematographic projectors for narrow film are, in general, provided with arms or with any other support for two spindles as receiving means for the feed spool and the receiving spool of the film respectively.

For loading the projector, the device requires the following operations: placing the empty receiving spool in position on the receiving spindle, removal of the full spool from its box and placing it in position on the feed spindle, passing the film through driving components, and finally hooking of its end on the hub of the receiving spool. After the projection, it is necessary to re-wind the film on to the feeding spool; this operation is usually effected mechanically on the projector. In order to be able to do this at great speed, it is necessary to disengage the film from its driving components such as feeders and claws. This re-winding operation constitutes a pure waste of time between the projection of two consecutive spools.

Known devices partly overcome the above enumerated disadvantages. Automatic loading devices are known which ensure the placing of the film in position on the driving components, some of which devices even ensure this as far as the hooking of the film on the hub of the receiving spool. Even more recently a projector has appeared on the market, with an incorporated receiving spool and the re-winding operation of which is triggered automatically at the end of the projection of each spool.

In another field, progress recorded recently in the sphere of the definition of emulsions (in particular for substandard cinema sizes) and the constant improvement in light sources make it possible to increase still further the enlargement ratio between the image recorded on the film and the dimensions thereof projected onto the screen, making the questions of conservation of the properties of neatness and integrity of the film more critical. With the majority of known devices each projection requires direct manual manipulation of the film spools. The fact that they are then exposed on the projectors to dust and the rapid re-winding develops forces between the turns which may lead to scratching of the film if dust is deposited on its surface and renders it impossible sufficiently to guarantee the preservation and integrity of the film.

Projectors are also known fitted with closed loaders, in which a fixed and predetermined length of film can be introduced in the form of an endless loop. However, if these devices do in fact protect the film from dust and ensure re-winding during projection, they do not avoid the sliding between loops which always leads, sooner or later, to superficial micro scratches which reduce the quality of the projected image.

Furthermore, the majority of these loaders cannot be filled by the user, which obliges him to send all his films to a center handling this work, before being capable of projecting them. Thereafter any intervention such as cutting, mounting and the like, is prohibited to him, unless he returns his loaders to the said center.

The object of the present invention is to avoid the above stated defects and, in particular, the wasted rewinding time, while permitting a slow re-winding speed.

The projector according to the present invention is characterised in that has a support to receive several film spools placed in at least one loader, means for displacing the loader(s) and for permitting each spool to be brought into the projection position, the receiving means being arranged in such manner as to permit the return of a projected film to its spool in the loader, while it receives the film from another spool in the course of projection.

The accompanying drawings show by way of example an embodiment of a projector constructed in accordance with the present invention:

FIGURE 12 shows a sectional view of a coupling of the device according to FIGURE 11.

FIGURE 13 is a section along the lines XIII—XIII of FIGURE 12.

FIGURE 14 shows a detail of the mechanism of FIGURE 11.

FIGURES 15 and 16 show the re-winding mechanism in two positions.

Figure 1:
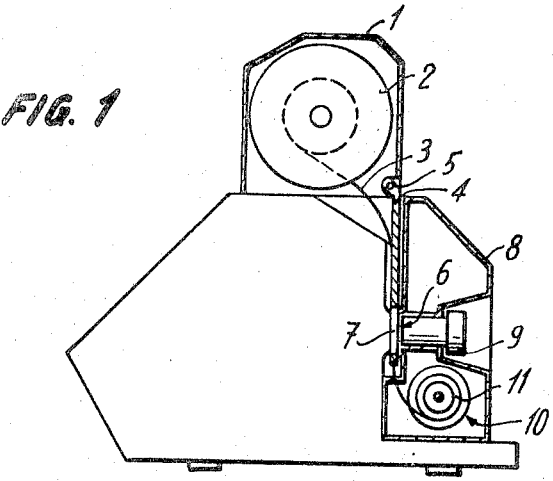
FIGURES 1 and 2 are schematic side and front views of the projector.
Figure 2:
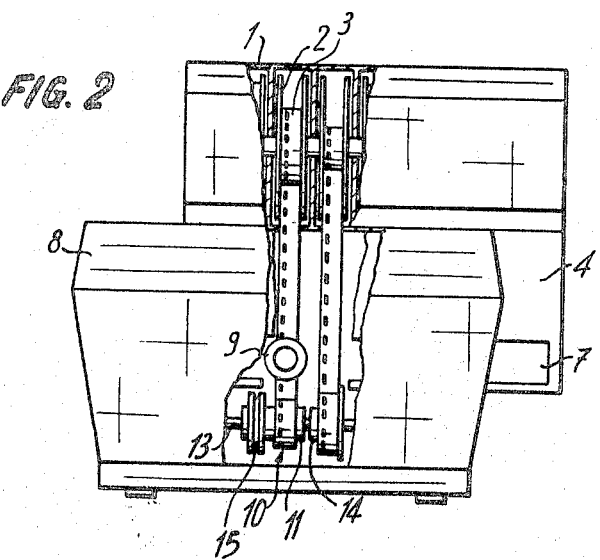
Figure 3:
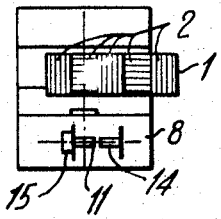
FIGURES 3 to 8 illustrate very schematically the different phases of the operation of the projector.

The projector shown in FIGURES 1 and 2 comprises a loader 1, in which several spools 2 of film 3 are disposed side by side and coaxially.

The loader 1 is capable of effecting, on the one hand, a transverse displacement to bring the desired spool behind lens 9 and, on the other hand, a movement from the rear to the front to disengage the film from the driving members (not shown).

The loader 1 has a cover 4 capable of pivoting at 5 and adapted, on the one hand, to engage the end of the film 3 of each spool and to present it in the driving device (not shown) in the axis of the lens 9 and, on the other hand, to close the opening through which the spools 2 are introduced into the loader 1. This cover also has a window 7 for the passage of light from a lamp. The projector also comprises a front part 8 on which the lens 9, a device 10 for receiving and returning the film 3 and a pressing flap 6 are mounted. The front part 8 may be displaced forwardly in the direction of the optical axis of the projector in order to permit the advance of the loader 1 and the disengagement of the film from the driving and guiding devices. Thus, when the front part 8 and the loader 1 are in the forward position, the loader may be displaced one step transversely, also referred to as indexing, and the film 3, disposed on the receiving and returning device 10 shifts from the film receiving position to the film return or rewinding position.

The receiving and returning device 10 comprises a receiving spindle 11, which is rotated by known means and carries a displaceable push plate or the like member 15 adapted to transfer the roll of film from the receiving spindle 11 to a return spindle 14 capable of turning about the spindle 13. These two spindles 11 and 14 include means, not shown, for engaging the end of the film. For example, one or more slots may be provided in the spindles, in one of which slots the end of the film is inserted.

The movement of the push member 15 is synchronized with the displacement of the loader 1, in order to avoid twisting the film.

The operation of the projector is shown schematically in FIGURES 3 to 8.

Figure 4:
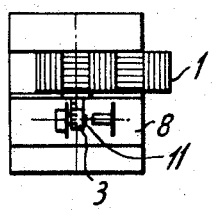

For loading the projector, the front part 8 is moved forward and the loader is moved into the advanced position. The lateral position of the loader is selected such that the spool which it is desired to project, is located opposite the lens. In the embodiment shown, the loader 1 comprises five spools and it is the fourth, counting from the right, which is to be projected. FIGURE 4 shows that the loader 1 and the front part 8 have been returned into working position. The film 3 is engaged on the receiving hub 11 and projection may begin.

Figure 6:
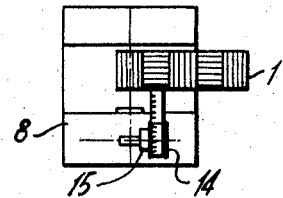
Figure 5:
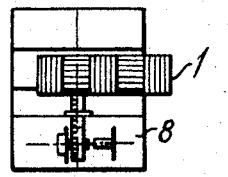

In FIGURE 5, all the film has passed from spool No. 4 onto the receiving spindle. Projection is stopped and the loader 1 and the front part 8 have been brought to the advanced position. In FIGURE 6, the loader 1 has been displaced laterally one step to the right, indexed so that the following film No. 5 comes into the projection position. Simultaneously, film No. 4, which is on the receiving spindle 11, has been transferred by the push plate 15 to the return spindle 14.

Figure 7:
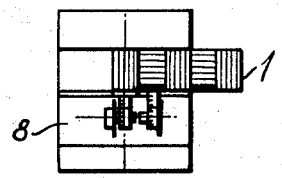

In FIGURE 7, the loader 1 and the front part 8 are returned to the working position. The push plate 15 has returned to the inoperative position. Film No. 5 is projected and winds around the receiving spindle 11, while re-winding of film No. 4 proceeds simultaneously.

Figure 8:
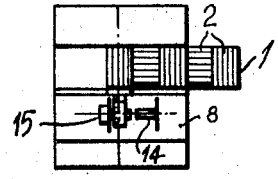

In FIGURE 8, the re-winding of film No. 4 is concluded, while the projection of film No. 5 proceeds. When the projection of film No. 5 is concluded, the front part and the loader are advanced into the inactive position and the loader will be indexed one step to the right so as to bring spool No. 5 into the re-winding position, the latter being effected during the idle time. In the event of the loader comprising more than five spools, spool No. 6 would be simultaneously projected and the projection cycle would proceed until the last spool was re-wound.

The control of the indexing of the loader may be effected automatically. For this purpose, the projector may comprise a device sensitive to the tension of the film between its spool and the driving device, the device controlling the succession of the above-described operations, which are necessary to displace the loader by one step to the right.

The passage from one film to the next may be effected very rapidly, for example, in less than two seconds; it is possible to pass from the projection of one film to the next without it being necessary to stop the projector.

In any case, as a film is re-wound during the projection of the following film, the re-winding may be effected very slowly, at the minimum at the same speed as that of projection. However, it seems more advantageous to select a re-winding speed which is a little higher, for example, twice or three times the speed of projection; however, this is still a very low speed compared with that of the re-winding in the case of conventional projectors.

The described projector is intended to permit the successive projection of all the films contained in a loader, but it is clear that means could be provided permitting, as desired, the projector not to be loaded with the following film while the re-winding of a film is effected in case the user wishes to project only some of the films, not necessarily adjacent, contained in the loader.

It is necessary to prevent the film disengaging from the spool at the end of projection, because this would involve a serious complication on the occasion of rewinding. For this purpose the projector may comprise stop members adapted to be introduced into the hub of each spool to allow the inner end of the film to be fixed to the hub without having to unwind the film previously.

It is known that film spools obtained in the trade have a split hub, this hub being partly opened on at least one of the sides of the spool.

It is therefore sufficient to introduce a stop member in the hub to compress part of the film which is passed through the slot and is inside the hub and thus to obtain sufficient attachment of the film to the hub.

For the purpose of facilitating engagement of the film on the receiving spindle, the opening for the beginning of the film may be fitted with a metal member, preferably of ferromagnetic material. This member may then control the stopping of the re-winding of the film automatically by means of a magnetic relay and also ensure predetermined position of the end of the film on the cover when the film has been rewound.

Figure 9:
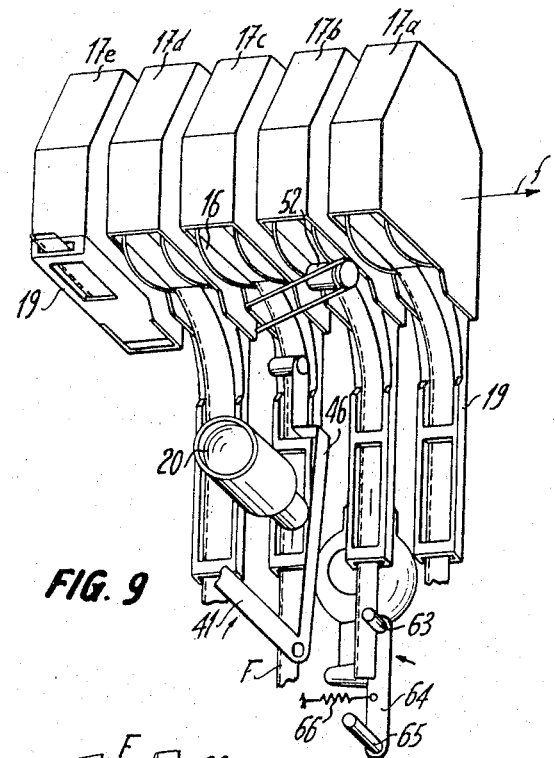
FIGURE 9 is a perspective view illustrating the successive passage of the film in front of the lens of the projector.

FIGURE 9 shows a modification in which each spool 16 of the film to be projected is contained in a case 17a to 17e. These cases are carried by a sliding frame 18, shown in FIGURE 11. Each case has a hinged cover 19 providing the passageway and guide means for the film F passing in front of the lens 20.

The covers 19 of the cases 17 are open before these cases are placed on the frame 18, which permits bringing one or the other of the passageways provided by the covers 19 in front of the lens 20 to effect the projection of the desired film. Only case 17e has been shown with its cover 19 closed to show the appearance of the case when it is not used. It is understood, however, that this case should normally be open when it is placed on the apparatus.

The cases 17a to 17e are brought successively into the projection position by a displacement in the direction of the arrow f (FIG. 9) of the frame carrying the cases. In FIG. 9, the case 17b is in re-winding position, because its film has been projected just before the film in case 17c.

To make sure that the projector permits re-winding a film while the following film is projected, it is necessary to provide a double receiving means which can receive a new film while it still contains the film previously projected which must be rewound.

Figure 10:
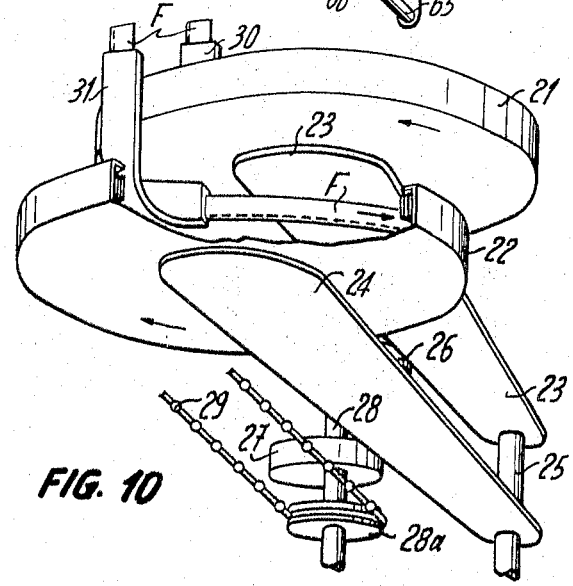
FIGURE 10 shows a double receiving means for the film.

FIGURE 10 shows schematically such a receiving means. This means consists of two drums 21 and 22 which can turn freely on the end of two arms 23 and 24, these arms being articulated on a shaft 25. Springs, not shown, keep the arms 23 and 24 in contact with cams 26 and 27 respectively, carried by a shaft 28 which can be driven by means of a pulley 28a and a notched belt 29.

Each drum can receive a film of one of the cases 17, and to this end it comprises a guide 30 and 31 respectively, adapted to receive the film arriving in its direction of displacement behind the objective lens 20 and to deflect it so that it penetrates into the corresponding drum in a substantially tangential direction to the periphery of the drum. Since the drums 21 and 22 turn freely on the arms 23 and 24, these drums are driven by the friction of the film which is brought to or removed tangentially from its edge. Thus, at the time of loading of a drum, the film entering the latter constitutes initially a spiral which comes in contact with the peripheral raised edge of the drum. When the film continues to be fed to the edge, it forms successive spirals which are placed one inside the other.

Figure 11:
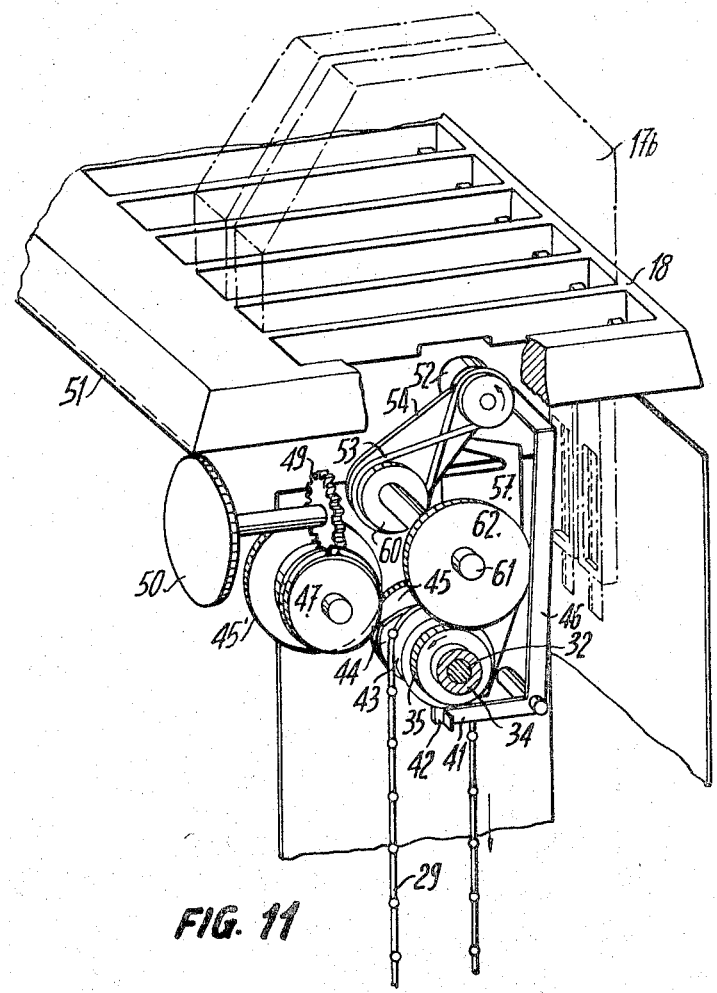
FIGURE 11 shows the displacement device of the loader.

FIGURE 11 is an overall view of the driving mechanism for changing the film, while FIGS. 12 to 14 show details of this mechanism. The mechanism comprises a shaft 32 driven continually by an electric motor, not shown. The shaft 32 carries a coupling 33 which is shown in detail in FIGS. 12 and 13. With reference to these figures, the shaft 32 drives a part 34 provided with ordinary teeth 35 and sawteeth 36. A part 37 turns freely on the shaft 32 and carries a coupling member 38 having a tooth 39 adapted to engage the sawteeth 36. This member 38 is subjected to the action of a spring 40 tending to engage the tooth 39 in the teeth 36. However, the engagement of said last mentioned elements is prevented by a stop member 41, which retains a nose 42 of the member 38. The part 37 supports a pulley 43 for the notched driving belt 29 of the double receiving means, and also supports a cam 44 and a gear wheel 45, the use of these latter parts being indicated below.

The stop member 41 is formed by the end of a lever 46 (FIG. 9) which cooperates with the film F during the course of projection. At the end of the projection of a spool, the film tends to enter the driving claw, not shown, on the spool 16, because the film is secured to the spool. This tension of the film causes the lever 46 to swing counterclockwise so that the stop member 41 occupies the position indicated by 41a in FIGURE 13, thus allowing the nose 42 to escape.

At this moment, the stop or tooth 39 engages the teeth 36 and the part 37 is driven with the shaft 32. The gear wheel 45 then drives another gear wheel 45', which rotates together with a wheel 47 carrying a cam 48 engaged between the teeth of a wheel 49. As can be seen from FIG. 11, this wheel 49 drives a gear wheel 50 which engages a rack 51 integral with the frame 18. When the coupling 33 makes a complete turn, the wheel 47 also makes a complete turn, which results in shifting the frame 18 laterally by the distance necessary to change from the projection of one film to the following film.

During the displacement of the frame 18, the stretched film, which has caused the swinging of the lever 46, is displaced laterally, so that the lever can resume its original position under the action of a spring, not shown, and the stop member 41 consequently resumes its position against the nose 42. Thus, before the coupling element 33 has made a complete turn, the member 41 is in the path of the nose 42 and when the latter is stopped, the part 38 is displaced against the action of the spring 40 to disengage the tooth 39 from the teeth 35.

Each time the frame 18 is displaced by one step, the receiving drum, which receives the film that has been projected, is displaced together with the frame 18. The simultaneous displacement of the drums 21 and 22 is obtained by a suitable profile of the cams 26 and 27. Moreover, the driving wheel 28a of these cams has a diameter, which is twice that of the wheel 43 of the coupling mechanism 33 so that, when the latter makes a complete turn, the cams 27 and 28 make only a half turn.

The cam 44 of the coupling device 33 is used for the re-winding drive of the film that has been projected, as illustrated particularly in FIGS. 15 and 16. The re-winding is effected by means of a roller 52 driven by a belt 53, this roller bearing against the periphery of the side plates of the spool 16 carrying the film to be rewound.

To this end, this roller 52 is carried by an arm 54 subjected to the action of a spring 55 and retained against the action of the latter (FIG. 15) by the slope 56 of a pivoting member 57, said slope cooperating with a stud 58 carried by the arm 54. The member 57 is held by a spring 59 against the cam 44 of the coupling mechanism. When the cam 44 makes a rotation it displaces the member 57 against the action of the spring 59, which releases the arm 54 and brings the roller 52 into contact with the spool driving belt 53 of the roller 52 which belt passes over a pulley 60 secured on a shaft 61 carrying a gear wheel 62 meshing with the gear wheel 35 of the coupling mechanism (FIG. 12).

When the film which has been projected is completely rewound, for example, in the case of 17b with reference to FIG. 9, its end releases a stud 63 of an arm 64 so that the latter pivots about a shaft 65 under the action of a return spring 66. The shaft 65 is shown in FIG. 15 and in FIG. 16, and its rotation causes, by means of a cam 67 carried by this shaft, the swinging of catch 68 which retained the part 57 against the action of its return spring 59. This part can thus be displaced and its slope 56 disengages the roller 52 from the periphery of the corresponding spool 16.

Numerous embodiments may of course be provided, among which there may be mentioned that in which the loader 1 is provided with several covers so that each film spool has its own cover. An elementary loader could also be provided for each spool, each loader having a cover provided with a window for the passage of light, said loaders being placed together, for example, stacked, in the projector.

We claim:
1. A cinematographic projector comprising:
   (1) a body;
   (2) a light source, an objective lens, a film driving mechanism, means for feeding the film to be projected, receiving means for receiving the projected film and a loader support for receiving several spools placed in at least one loader, mounted on the body;
   (3) indexing means for displacing the loader and indexing each spool in a projection position;
   (4) rewinding means for simultaneously returning a projected film from the receiving means to its original spool in the loader while another film is fed to the receiving means.

2. A projector as claimed in claim 1, having a loader for at least two spools of film, a corresponding number of covers each hinged at one end to the loader, means on the covers for guiding the film of corresponding spools and means for retaining the ends of the films on the spools.

3. A projector as claimed in claim 1, in which a pressure sensitive device is carried on the body between the loader support and the driving means and is operatively connected to the indexing means.

4. A projector as claimed in claim 3, in which the spools are disposed in coaxial side by side relationship.

5. A projector as claimed in claim 2, having a window in each of the covers for allowing the passage of light from the light source.

6. A cinematographic film projector including a projector body, a light source, an objective lens, a film driving mechanism and means for feeding the film to be projected, a loader support mounted on said projector body and containing a plurality of spools of film mounted in side-by-side relationship in at least one loader,
   indexing means for displacing the loader relative to said body and indexing each spool into a projecting position,
   film receiving and returning means adapted to simultaneously receive a film to be projected and return a second film which has already been projected to its related spool, said film receiving and returning means including a receiving spindle and a return spindle disposed in coaxial side-by-side relationship in the front part of said projector, said film receiving and returning means further including drive means engageable with an empty spool to rotate it and rewind the projected film thereon, and pushing means co-axial with said receiving and return spindles for moving projected film from the receiving spindle to the return spindle.

References Cited

UNITED STATES PATENTS

| 1,174,499 | 3/1916 | Heitherington | 352—125 |
| 1,253,372 | 1/1918 | Gotti | 352—125 |
| 2,206,134 | 7/1940 | Streyckmans | 352—8 |
| 2,755,030 | 7/1956 | D'Ornellas | 352—123 X |
| 2,998,748 | 9/1961 | Dessilani | 352—123 |
| 3,139,788 | 7/1964 | Hughes et al. | 352—80 X |

JULIA E. COINER, *Primary Examiner.*